(12) United States Patent
Sengupta et al.

(10) Patent No.: US 11,062,220 B2
(45) Date of Patent: Jul. 13, 2021

(54) INTEGRATED VIRTUAL COGNITIVE AGENTS AND MESSAGE COMMUNICATION ARCHITECTURE

(71) Applicant: Accenture Global Solutions Limited, Dublin (IE)

(72) Inventors: Shiladitya Sengupta, Bangalore (IN); Gopali Raval Contractor, Mumbai (IN); Deepmala Gupta, Bangalore (IN); Maria Lopes, Mumbai (IN); Rahul Sarkar, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 925 days.

(21) Appl. No.: 15/608,258

(22) Filed: May 30, 2017

(65) Prior Publication Data

US 2017/0344889 A1 Nov. 30, 2017

(30) Foreign Application Priority Data

May 31, 2016 (IN) .............................. 201641018601

(51) Int. Cl.
| | |
|---|---|
| *G06N 20/00* | (2019.01) |
| *G06N 5/04* | (2006.01) |
| *G06Q 50/00* | (2012.01) |
| *H04L 29/08* | (2006.01) |
| *G06F 40/30* | (2020.01) |
| *G06F 40/56* | (2020.01) |

(52) U.S. Cl.
CPC ............ *G06N 5/043* (2013.01); *G06F 40/30* (2020.01); *G06F 40/56* (2020.01); *G06N 20/00* (2019.01); *G06Q 50/01* (2013.01); *H04L 67/22* (2013.01)

(58) Field of Classification Search
None
See application file for complete search history.

(56) References Cited

U.S. PATENT DOCUMENTS

| | | | |
|---|---|---|---|
| 8,620,659 B2 * | 12/2013 | Di Cristo | ................ G10L 15/22 704/257 |
| 2013/0275164 A1 | 10/2013 | Gruber et al. | |
| 2016/0110422 A1 | 4/2016 | Roytman et al. | |

OTHER PUBLICATIONS

Oracle, Oracle® Communications Messaging Server Reference, Release 8.0.1, 2015, pp. 1-1458 (Year: 2015).*

* cited by examiner

*Primary Examiner* — Wilbert L Starks
(74) *Attorney, Agent, or Firm* — Brinks Gilson & Lione

(57) ABSTRACT

A virtual cognitive agent (VCA) system comprises social media communication channels integrated with machine cognition engines. The VCA system connects to an external message platform and accesses posted messages. An intent is determined and sentiment analysis is performed on text elements from the intercepted messages to determine handling of the message. The integrated machine cognition engines determine a response to the captured message. The VCA system may access a corpus or exchange data with the originator of the post or another entity to determine the response. The integrated social media communication channels may connect to an external query response platform and communicate the response to the query response platform.

16 Claims, 6 Drawing Sheets

INTEGRATED VIRTUAL COGNITIVE AGENTS AND MESSAGE COMMUNICATION ARCHITECTURE

PRIORITY CLAIM

This application claims priority to Provisional Indian Patent Application No. 201641018601, filed on May 31, 2016, titled "VIRTUAL COGNITIVE AGENTS FOR CUSTOMER SERVICE ON SOCIAL MEDIA," which is incorporated herein by reference in its entirety.

TECHNICAL FIELD

This application relates to virtual cognitive agents. More specifically this application relates to artificial intelligence implemented virtual cognitive agents integrated with social media channels for automated query response services.

BACKGROUND

The global proliferation of high speed communication networks and ever increasing data communications has created unprecedented levels of interaction among individuals in society. Social media systems have grown on top of these networks and become firmly entrenched. The interactions powered by the social media systems have given rise, in some instances, to new expectations regarding how, when, and where communication should be accomplished. Improvements to handling user queries presented on social media services will help companies better serve their customers.

DETAILED DESCRIPTION

The system described below includes virtual cognitive agent (VCA) circuitry that implements and executes machine learning techniques to better detect, understand, and answer user queries. The user queries may be presented on social media services or any other service or data platform. The circuitry that implements the VCAs may monitor user data platforms, including social media sites, and perform analysis of user posts for content, sentiment, and other characteristics. In the system, a VCA analyzer performs an analysis of user concerns/queries, and responds in a personalized and contextual manner framing appropriate responses. The VCA integrates with customer resource management (CRM) systems to obtain and input additional customer details to enrich customer data over time. Some benefits include: the VCA delivers a more real-time, personalized service to the user; substantial decrease in operational costs for businesses that serve the users; increased conversations that may lead to cross selling and up selling; and deeper customer insights. The VCA system that implements the VCAs may offer the VCAs as a service on a per-businesses basis.

Figure 1:
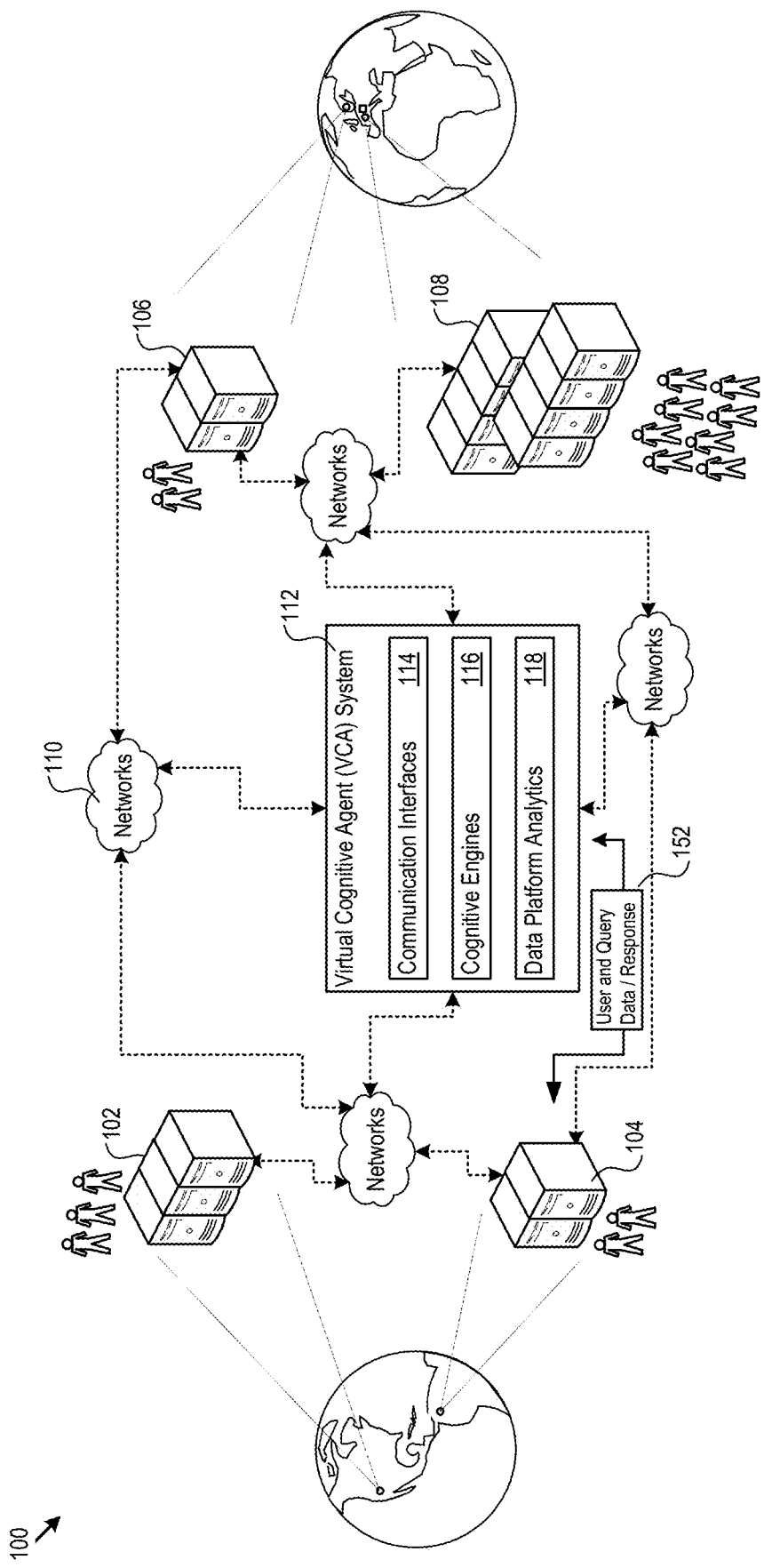
FIG. 1 shows an example of a global network architecture.
Figure 2:
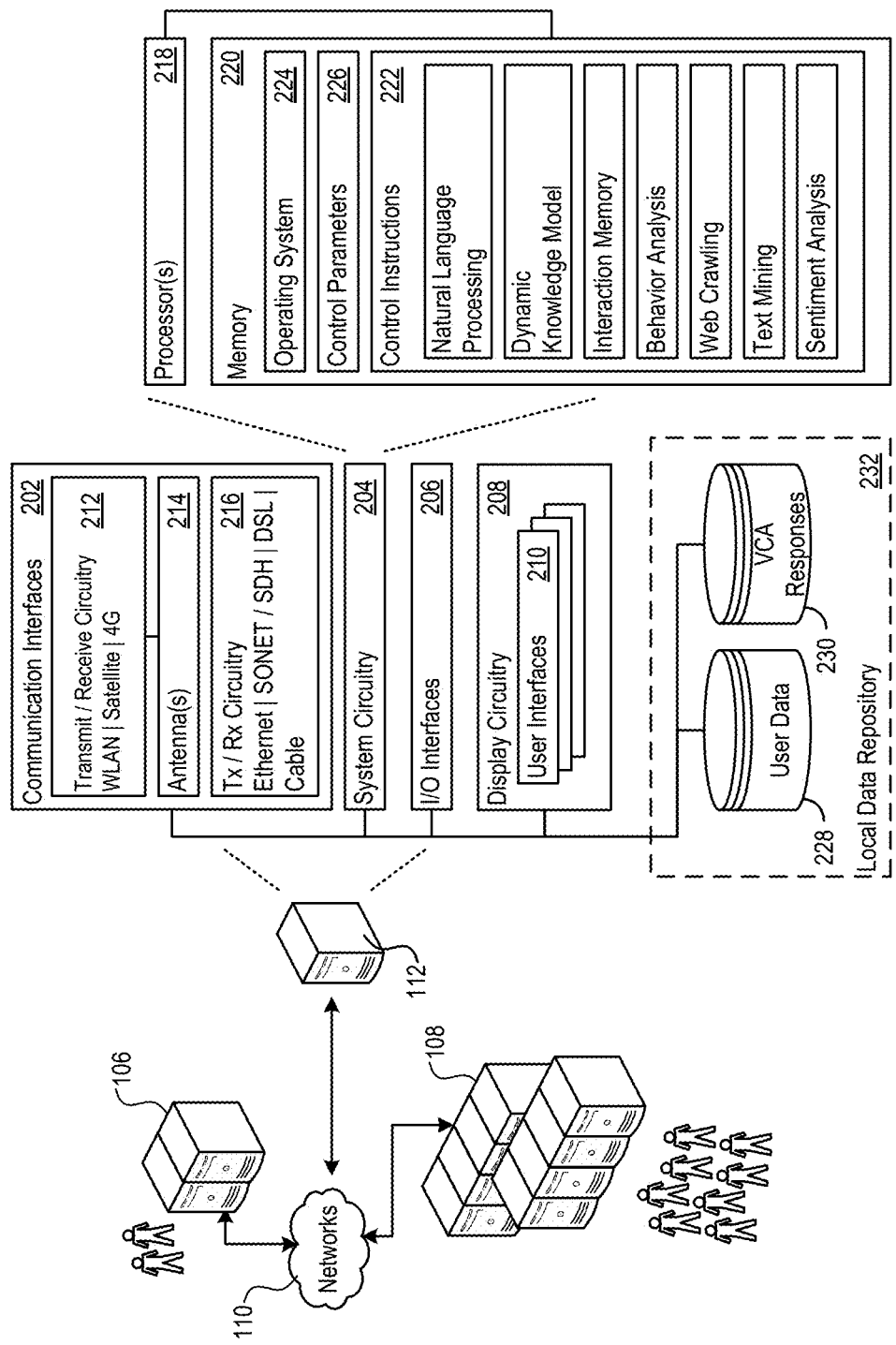
FIG. 2 illustrates an example implementation of a virtual cognitive agent system.

FIGS. 1 and 2 provide an example context for the discussion below of the technical solutions in the system. The examples in FIGS. 1 and 2 show one of many possible different implementation contexts. In that respect, the technical solutions are not limited in their application to the architectures and systems shown in FIGS. 1 and 2, but are applicable to many other system implementations, architectures, and connectivity.

FIG. 1 shows a global network architecture 100. Connected through the global network architecture 100 are data platforms 102, 104, 106, and 108 that provide email, instant message, video conference, chat room, discussion group, online forums, help desk, and other types of message exchange systems to any number of users and for any type of services. The data platforms 102-108 may support social media systems, for instance. The data platforms 102-108 may include hardware processing systems such as computing and/or communication devices comprising processing circuitry, memory and communication interfaces. The data platforms 102-108 may be located in any geographic region, e.g., the United States, Europe, or Asia.

Throughout the global network architecture 100 are networks, e.g., the network 110. The networks provide connectivity between the data platforms 102-108 and a VCA system 112. The networks 110 may include private and public networks defined over any pre-determined or dynamic internet protocol (IP) address ranges.

The VCA system 112 makes complex and technical user query and response decisions. As an overview, the VCA system 112 may include communication interfaces 114, cognitive engines 116, and data platform analytics 118. The communication interfaces 114 connect the VCA system 112 to the networks 110 and the data platforms 102-108, and facilitate data exchange 152, including receiving user data and query data, and sending VCA responses to the users. The cognitive engines 116 implement processing techniques that drive automated VCA responses to the users, as will be described below. The data platform analytics 118 may include features such as web crawling, text mining, and sentiment analysis on data received that characterizes the user. The data platform analytics 118 may generate analytics results that help drive, in real-time, the cognitive engines 116 and may also provide input to other user response systems (e.g., customer service teams).

FIG. 2 shows an example implementation of the VCA system 112. The VCA system 112 includes communication interfaces 202, system circuitry 204, input/output (I/O) interfaces 206, and display circuitry 208 that generates user interfaces 210 locally or for remote display, e.g., in a web browser running on a local or remote machine. The user interfaces 210 and the I/O interfaces 206 may include graphical user interfaces (GUIs), touch sensitive displays, voice or facial recognition inputs, buttons, switches, speakers and other user interface elements. Additional examples of the I/O interfaces 206 include microphones, video and still image cameras, headset and microphone input/output jacks, Universal Serial Bus (USB) connectors, memory card slots, and other types of inputs. The I/O interfaces 206 may further include magnetic or optical media interfaces (e.g., a CDROM or DVD drive), serial and parallel bus interfaces, and keyboard and mouse interfaces.

The communication interfaces 202 may include wireless transmitters and receivers ("transceivers") 212 and any antennas 214 used by the transmit and receive circuitry of the transceivers 212. The transceivers 212 and antennas 214 may support WiFi network communications, for instance, under any version of IEEE 802.11, e.g., 802.11n or 802.11ac. The communication interfaces 202 may also include wireline transceivers 216. The wireline transceivers 216 may provide physical layer interfaces for any of a wide range of communication protocols, such as any type of Ethernet, data over cable service interface specification (DOCSIS), digital subscriber line (DSL), Synchronous Optical Network (SONET), or other protocol.

The system circuitry 204 may include any combination of hardware, software, firmware, or other circuitry. The system circuitry 204 may be implemented, for example, with one or more systems on a chip (SoC), application specific integrated circuits (ASIC), microprocessors, discrete analog and digital circuits, and other circuitry. The system circuitry 204 is part of the implementation of any desired functionality in the VCA system 112. As just one example, the system circuitry 204 may include one or more instruction processors 218 and memories 220. The memory 220 stores, for example, control instructions 222 and an operating system 224. In one implementation, the processor 218 executes the control instructions 222 and the operating system 224 to carry out any desired functionality for the VCA system 112. The control parameters 226 provide and specify configuration and operating options for the control instructions 222, operating system 224, and other functionality of the VCA system 112.

The VCA system 112 may include a local data repository 232 that includes volume storage devices, e.g., hard disk drives (HDDs) and solid state disk drives (SDDs). The storage devices may store a corpus comprising a large collection of texts. The corpus may include a body of written or spoken material upon which linguistic analysis may be based. In some embodiments the storage devices may include domain specific information. For example, domain specific information may include language related to a topic or product that is the subject of a user query or comment. The storage devices may define and store databases that the control instructions 222 access, e.g., through a database control system, to perform the functionality implemented in the control instructions 222. In the example shown in FIG. 2, the databases may include a user data database 228 and a VCA response database 230. In other implementations, any of the databases may be part of a single database structure, and, more generally, may be implemented logically or physically in many different ways. Each of the databases defines tables storing records that the control instructions 222 read, write, delete, and modify to perform the processing noted below. As one example, the user data database 228 stores user queries and user characteristics obtained from the data platforms, while the VCA response database 230 stores historical VCA responses and may provide input or feedback in a continuous learning process for the VCAs in the system 112.

The system circuitry 204 improves the functioning of the underlying hardware itself, by implementing the cognitive engines 116 and data platform analytics 118 that greatly facilitate having the underlying hardware analyze and answer user queries. In one implementation, the system circuitry 204 implements the cognitive engines 116 and data platform analytics 118 as control instructions 222 executed by the processor 218. The control instructions 222 may implement the functionality described in connection with the other Figures below.

Figure 3:
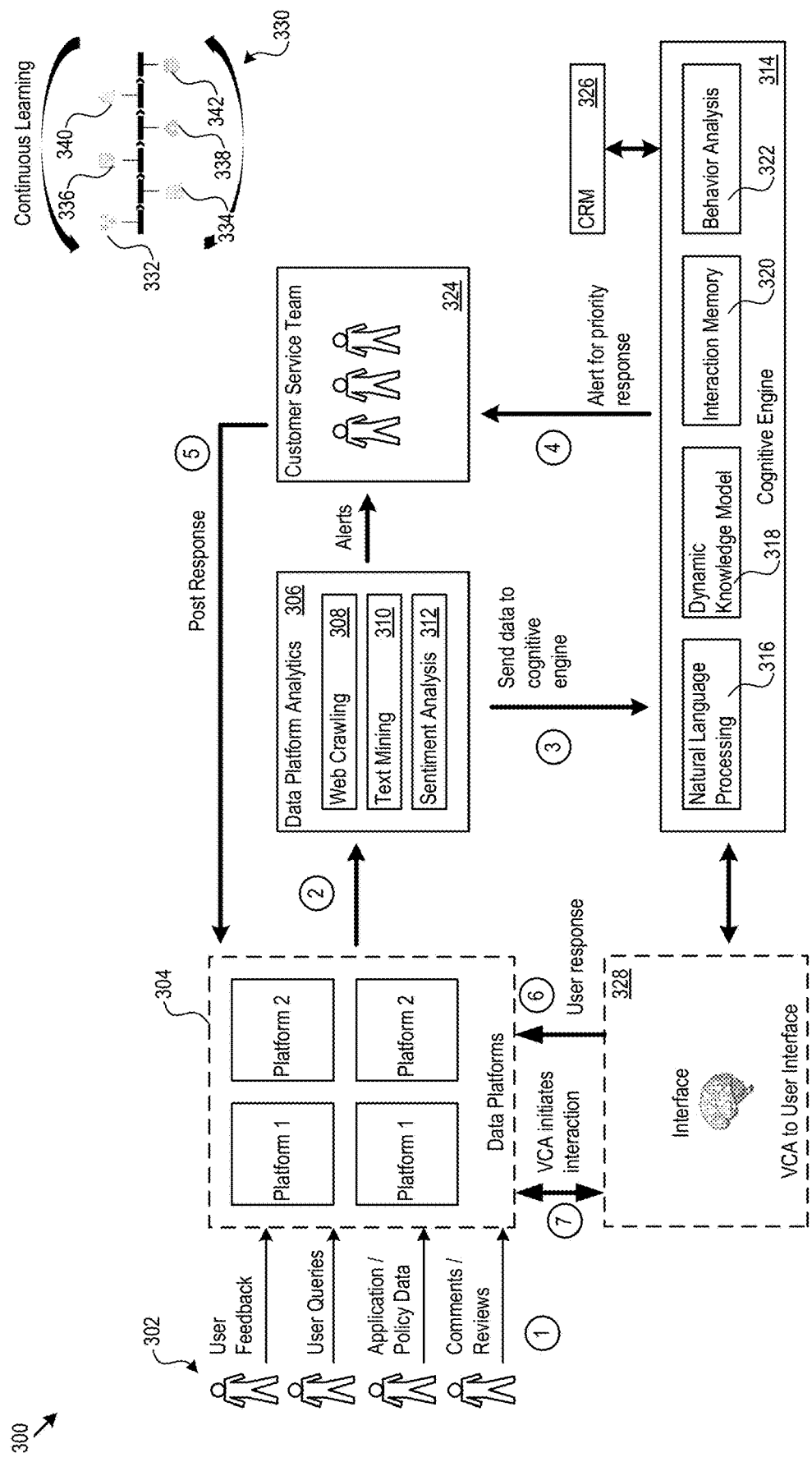
FIG. 3 shows a data flow diagram of the data moving through a virtual cognitive agent system.

FIG. 3 shows a data flow diagram 300 of the data moving through a virtual cognitive agent system. At (1), the users 302 provide input to the data platforms 304 in the normal course of using those platforms. The VCA system 112 includes data platform analytics 306 that obtain and process the user data (2). Examples of user data include user feedback, user queries, application policy data, and comments or reviews. The data platform analytics 306 may scan, analyze, retrieve, detect, and obtain any type of user data, via web crawling 308, text mining 310, sentiment analysis 312 or other techniques.

In real-time, the data platform analytics 306 provides its analysis results to a virtual cognitive engine 314 (3). The virtual cognitive engine 314 may include machine learning and other artificial intelligence (AI) processing features, such as a natural language processing module 316, a dynamic knowledge module 318, interaction memory 320, and behavior analysis module 322. In some instances, the virtual cognitive engine 314 determines that a priority response is needed, and responsively issues an alert, e.g., to a customer service system 324 (4). Note that the virtual cognitive engine 314 may obtain input from other systems, e.g., a CRM system.

The virtual cognitive engine 314 may inform its other processing stages with additional input that characterizes the user, the data platform, or other aspects of the user's experience or context. The virtual cognitive engine 314 may be trained with domain specific data. For example, it may be trained to answer questions that are frequently asked regarding insurance policies or claims. It may also be trained on conversation workflows that are followed by insurance companies to service their customers. For example, the conversation workflows may include customer inquiries regarding the status of a policy or claims, requests to make specific transactions or to change an insurance policy.

At any time, the customer service system 324 may issue responses to the user (5). For instance, the customer service system 324 may post replies or answers to user questions. The responses may post through the data platforms 304, or may flow directly to the user via a known address (e.g., an email or instant message address).

In many instances, however, the virtual cognitive engine 314 may answer or respond to users on its own accord. In one implementation of the VCA system 112, a VCA-to-user interface 328 delivers responses to the users post through the data platforms 304 (6), and may also automatically initiate interaction with the user (7), e.g., through email, social media or instant messages. The VCA-to-user interface 328 may include any type of user interface, including as a few examples, graphical user interfaces, voice generation, video output, email, text, social media, web or mobile portals, or other message input and output.

Stated another way, the VCA implements natural language processing that helps to uncover unstructured data relevant to the user and their queries. The VCA also includes hypothesis generation and evaluation and may use analytics to grade and evaluate responses based on available evidence. Still further, the VCA may implement dynamic learning to help learn based on data input and outcomes, thereby getting to smarter responses with each interaction. The VCA may engage in a continuous learning process (e.g., via AZURE® machine learning) 330. The learning process 330 may include, as examples, data procurement 332, data preparation 334, corpus creation 336, data upload 338, data training 340, and verification 342.

Figure 4:
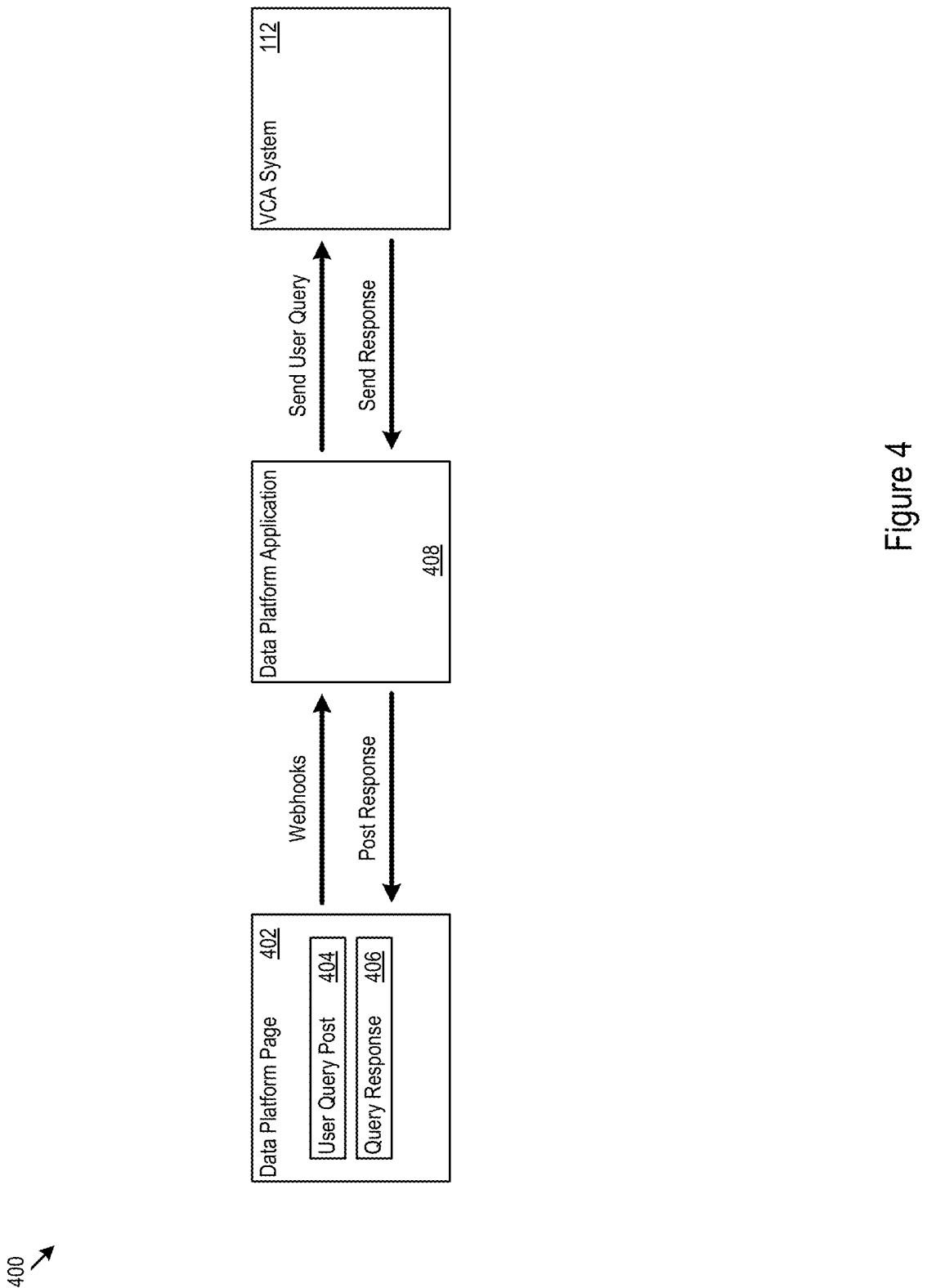
FIG. 4 shows an integration interface for connecting the virtual cognitive agent system to a data platform.

FIG. 4 shows an integration interface 400 for connecting the VCA system 112 to a data platform. In the example of FIG. 4, a data platform page 402 hosts user posts, including a user query 404, and also supports posting and displaying responses to the query, e.g., the query response 406. An internal data platform application 408 may run on the data platform page, and provide an interface between the data platform page 402 and the VCA system 112.

One specific example of the data platform application 408 follows. The data platform application 408 may implement interface methods including: a Graph application programming interface (API) that provides bulk historic data download and publish capabilities. A data live feed API may also be available as an interface. For a live update of page data on the data platform page 402, the data platform may provide, e.g., Webhooks. Webhooks allows an application to subscribe to changes in certain pieces of data, e.g., in the data platform page text fields (such as post and comment fields), and receive alerts of updates. The data platform application 408 thereby coordinates interaction with the VCA system 112, including publishing of responses automatically generated by a VCA running in the VCA system 112.

Figure 5:
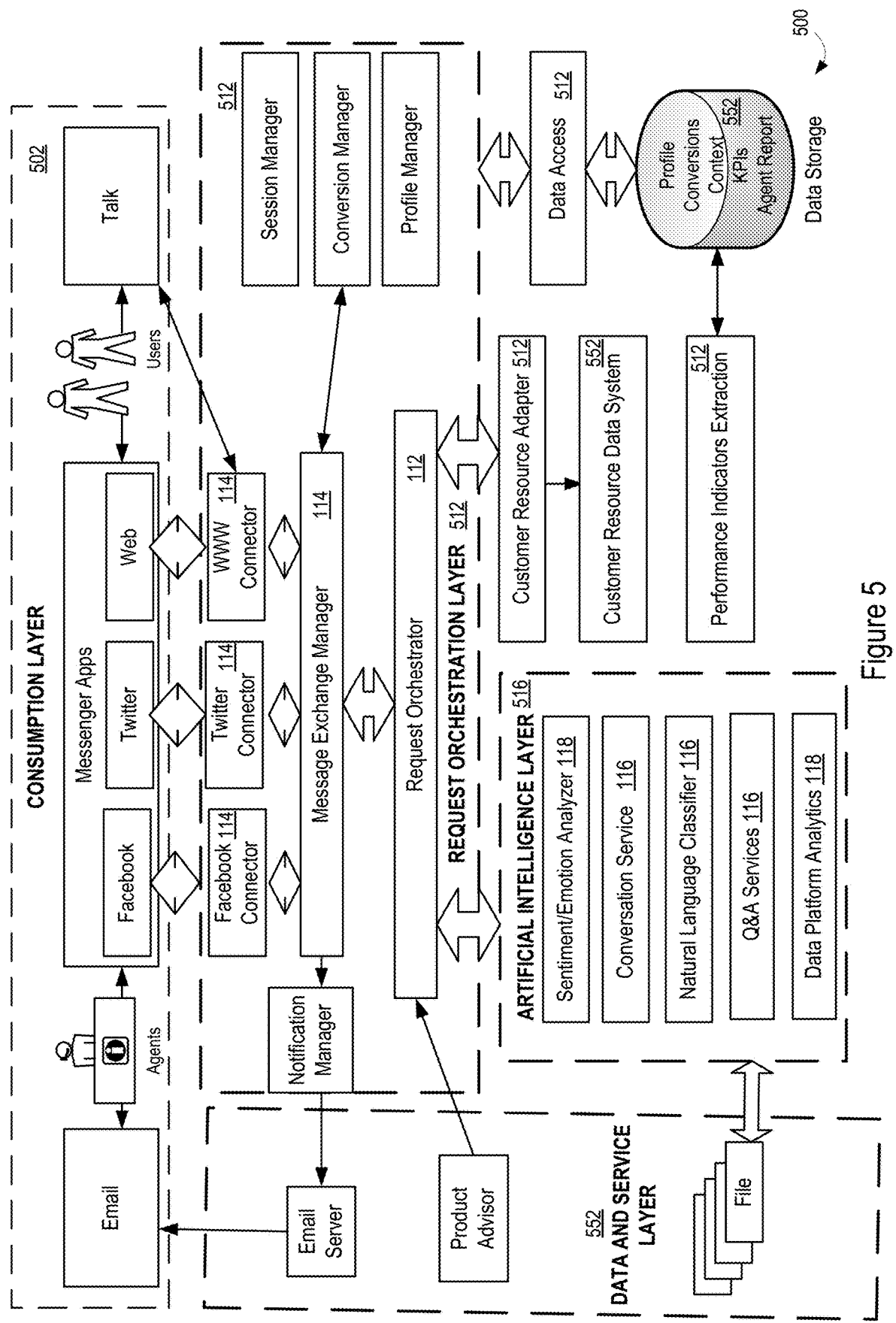
FIG. 5 shows an example architecture of a virtual cognitive agent system.
Figure 6:
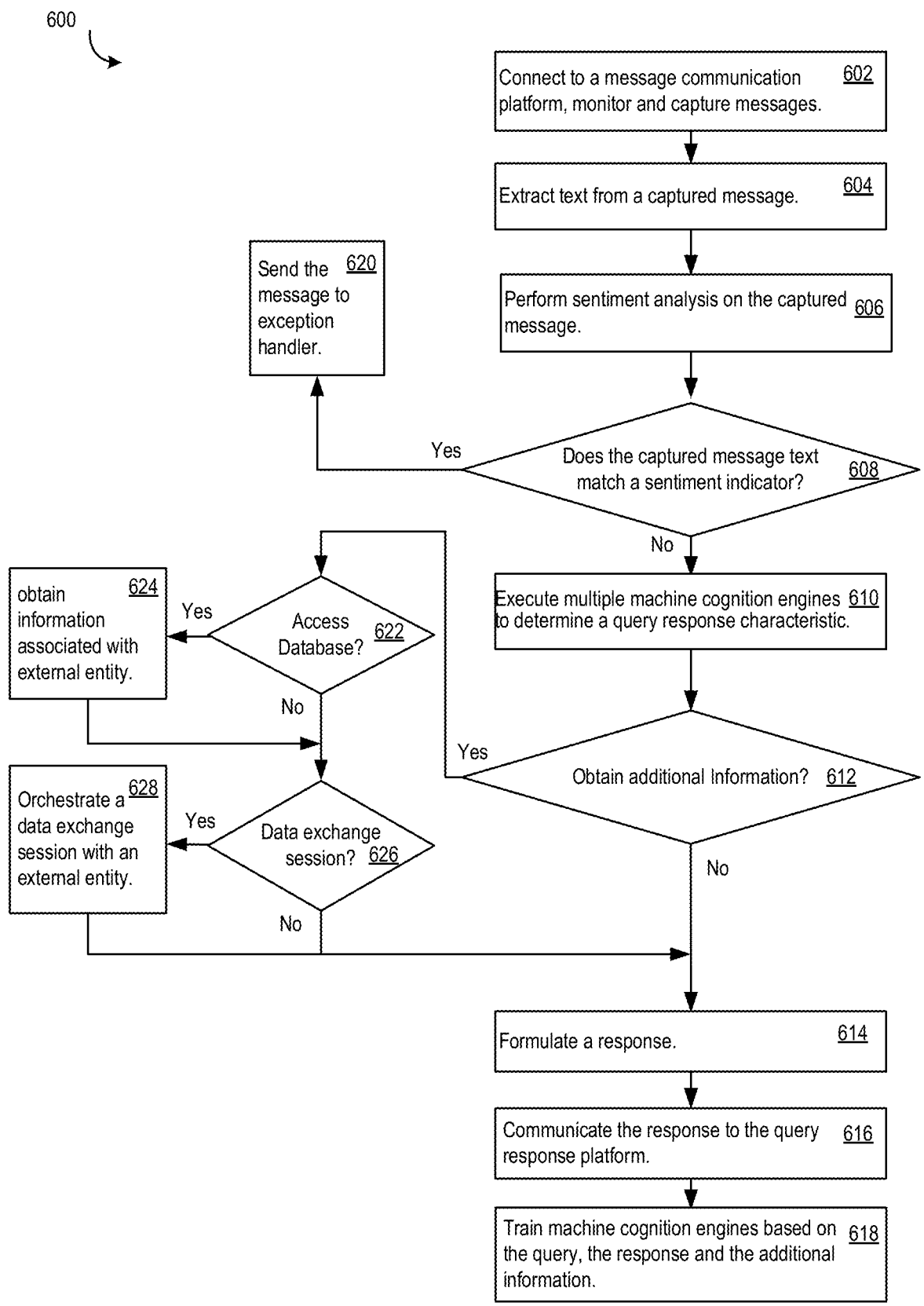
FIG. 6 shows logic for automatically responding to posted comments or queries by a virtual cognitive agent system.

FIG. 5 shows an example architecture of a virtual cognitive agent (VCA) system architecture 500. FIG. 6 shows logic that the system architecture may implement to automatically respond to posted comments or queries by a virtual cognitive agent system. The logic described with respect to FIG. 6 represents logic that may be implemented in hardware or software or both in a system, such as the systems described with respect to FIGS. 1-5.

The VCA system architecture 500 shown in FIG. 5 is a multi-layered architecture including a consumption layer 502, a request orchestration layer 512, an artificial intelligence layer and a data and service layer 552. The systems described in FIGS. 1-6 may implement all or part of the VCA system architecture 500. The VCA system architecture 500 may be hosted on one or more virtual machines or physical hardware processing systems that comprise processing circuitry, memory and communication interfaces.

The consumption layer 502 may be hosted on one or more data platforms such as the data platforms 102, 104, 106, and 108 of FIG. 1 or the data platforms described with respect to FIGS. 2 and 3. The consumption layer 502 may include one or more messenger applications or social media applications, such as FACEBOOK®, TWITTER®, a web portal, a mobile portal or any other suitable application that provides a messaging service that may facilitate text, voice, video or other types of data communication services. For example, the consumption layer social media applications may manage network or system access, organize messages and/or manage messaging via a network to or from the request orchestration layer 512 of the VCA system 112. In one embodiment, a user may post a comment or a query to a consumption layer 502 social media application that may be hosted on a data platform such as a cell phone, a laptop or any suitable communication and/or computing device, and the social media application may transmit the comment or query via a wireless or wireline network to the request orchestration layer 512. The request orchestration layer 512 may process the comment or query and provide a response to the user via the consumption layer 502 or by way of another communication channel such as via an email account.

The request orchestration layer 512, artificial intelligence layer 516 and the data and service layer 552 may be hosted by one hardware processing system or by multiple hardware processing systems that may communicate via a network. The one or more hardware processing systems may each comprise a computing and/or communication device comprising processing circuitry, memory and communication interfaces. For example, the request orchestration layer 512, artificial intelligence layer 516 and the data and service layer 552 may be hosted by the VCA system 112 or the system circuitry 204.

The request orchestration layer 512 may include a request orchestrator, a message exchange manager, one or more messenger application connectors, a notification manager, a session manager, a conversation manager, a profile manager a customer resource adaptor a data access controller and a performance indicators extraction controller.

The request orchestration layer 512 may be communicatively coupled with the consumption layer 502 via the message exchange manager and the one or more messenger application connectors, which may comprise the communication interfaces 114. The messenger application connectors may include, for example, FACEBOOK®, TWITTER®, web portal or mobile portal connectors that may communicate with the one or more messenger applications of the consumption layer 502. The message exchange manager may distribute messages received via the consumption layer 502 to components of the request orchestration layer 512, for example, to process a user's comment or query in the message. The message exchange manager may also forward data or responses from components of the request orchestration layer 502 to the consumption layer 502 to provide a response or conduct a conversation with the user. In some instances the message exchange manager may forward the data or responses to a notification manager that transmits the data or responses via a personal channel such as email or voice communications to users or service agents.

The artificial intelligence (AI) layer 516 may include one or more of the data platform analytics 118 and 306, the cognitive engines 116 and 314 and the control instructions 222, and may be operable to formulate a response to a user's comment or query posted via the consumption layer 502. The AI layer 516 may include multiple machine cognition engines, for example, one or more of: a data platform analytics agent, a sentiment/emotion analyzer, a natural language understanding processing agent, a natural language question and answering agent, a dynamic logic agent, a user behavior analysis agent, a machine learning agent, a conversation service and a natural language generation agent. In some systems, the AI layer 516 may be implemented using systems such as MICROSOFT® AZURE®, machine learning (ML) technologies, IBM® WATSON ANALYTICS® and other available or proprietary AI technologies. However, the application is not limited to any specific AI technology and any suitable AI software may be utilized. Each of the AI technologies may have a machine cognition engine or module to process a user's input and formulate a response, and may be optimized with custom code, for example, to improve natural language processing and intent classifications.

A data and service layer 512 may comprise, for example, an email server, a product advisor service, a response file system, a customer resource data system and a data storage system comprising a database. The database may include user profiles, conversation and/or interaction memory, user context information, performance indicators and VCA reports, for example. In some systems, all intercepted data, posts or conversations are consumed and stored in a VCA database for further analytics. The data and service layer 552 may be communicatively coupled to the request orchestration 512 layer and may provide information services and store provide data for determining, customizing or enhancing a response to a user comment or query. For example, responses may be customized for a user or a particular context based on user profiles and/or context information stored in a database of the data and service layer 552. Moreover, data collected during conversations between a user and the request orchestration layer 512, between the user and a human service agent or during machine interactions may be stored in an interaction memory and used by the VCA system to stay relevant to or maintain the context of the conversation. In instances when the subject of a user's comment or query is a product or service, a product advisor unit in the data and service layer 552 may provide relevant information to the artificial intelligent layer 516 to support formulation of a response to a user's comment or query.

In operation, the hardware processing system hosting the request orchestration layer 512 may connect via the message exchange manager to an external message communication platform, for example, to one or more of the data platform systems 102, 104, 106 or 108 that host consumption layer 502 components. The request orchestration layer 512 may monitor the external message communication platform for a trigger, and may capture or intercept a message structure hosted in the external message communication platform responsive to the trigger. The request orchestration layer 512 may use web crawling, text mining or any other suitable methods to detect the trigger and capture the message structure. Examples of triggers may include a comment or query posted on the external message communication platform, detection of a specified user submitting a message or detection of specified subject matter, product or service in a posted communication message. When a posted message event or comment is detected, it may trigger interception and storage of the message structure from the posted comment or query (602). The message structure may be message text, HTML, audio file, video file, a database record or entry, or a message including any suitable file format.

The request orchestrator in the request orchestration layer 512 may forward the message structure to the artificial intelligence layer 516. The artificial intelligence layer may use the data platform analytics 118 to extract a text element from the captured message structure. For example, a text element may be extracted from a field in the message structure that carries the user comments or queries (604). Any suitable message structure type may be supported. A message structure may include a set of fields. For example, a FACEBOOK® message structure may include fields for created time, sender, message identifier, message text, message subject, message source and recipient. In another example, a texting message structure may include fields for message type, sender, recipient, message text, time sent, time received, read time, service and read indicator. Text or information from any one or more fields of a message structure may be detected and/or extracted. For example, text elements from a message text field in a FACEBOOK® message structure may be extracted and processed by machine cognition components of the AI layer 516 to process and respond to a FACEBOOK® message. A key function of a natural language processing module may be to determine the intent of a posted message accurately. The natural language classifier 116 may help in capturing an intent for a customer's post. Furthermore, information detected in other fields of a message structure, such as a sender field or a subject field, may be read or extracted and utilized in further processing. For example, the some information may be utilized to trigger capture of the text element in the message structure, or the information may be stored and used in machine learning or to define user attributes, preferences or context.

A sentiment or emotion analyzer 118 may determine whether the extracted text element from the captured message structure matches a sentiment indicator. For example, the sentiment or emotion analyzer may determine that the text element includes negative, positive or neutral comments from the user (606) or that the user is happy, neutral, angry or very upset.

In instances when the sentiment or emotion analyzer 118 determines that the text element from the captured message structure matches the sentiment indicator (608), the message structure may be sent to an exception handler. In some systems, the exception handler may comprise a manual intervention system or human service agents. In some systems, the exception handler may comprise an machine automated response system. For example, when a negative comment is detected in the user's comments or query, the comments or query may be sent to the machine automated response system or to a human service agent via a notification manager in the orchestration layer 512 and an email server in the data service layer 552. The machine automated response system or the human agent may communicate with the user via the consumption layer 502 messenger applications or any other suitable data or voice communication network (620). In some systems, sentiment analytics may categorize a message structure as having positive, negative or neutral sentiments and the routing of the message for each category may be configurable. For example, a user may configure the VCA system to route the negative user comments or queries to the human agents or and positive or neutral sentiments to the automated response system.

In instances when the captured message structure does not match the sentiment indicator (608), the message structure may be sent to the AI layer 516 where multiple machine cognition engines may determine a query response characteristic in the message structure (610) and formulate a response (614). The query response characteristic may comprise, as examples: an intent, content of the message structure, a meaning of a user's comment or query or a type of a question. The orchestration layer 512 may connect to an external query response platform in the consumption layer 502 and may communicate the response to the query response platform (616). The external query response platform may comprise a social media platform, a web portal or a mobile device portal in the consumption layer 502. For example, the response may be communicated to the user via the originating messenger application in the consumption layer, by email, web page, mobile device browser page or by voice communications.

In some systems, the orchestration layer 512 may identify an external entity or user linked to the captured message structure and identify a private communication channel for the external entity or user, and further, may communicate the formulated response to the external entity through the communication interface and the private communication channel. For example, a profile manager in the orchestration layer 512 may access a database and retrieve a user's contact information, and the session manager may communicate the comment or query response to the user via the notification manager and the private communication channel, which may be, email, a test message or instant messaging for example.

In some instances when additional information may be needed to formulate the response (612), the request orchestration layer 512 may access a database in the data and service layer 552 (622) and may obtain attributes and information associated with an external entity or user. For example, the request orchestration layer 512 may access a user's profile information in a database to obtain information about the user's preferences, on-line history or a context associated with the user. Alternatively, in instances when the user is a customer, the orchestration layer may access a customer resource system in the data and service layer 552 via a customer resource adapter to gain information about the user as a customer. The AI layer 512 may utilize the obtained information to formulate and/or customize the response for the user.

In some instances when additional information may be needed to formulate the response (612), the request orchestration layer 512 may automatically orchestrate a data exchange session with an external entity linked to or associated with the captured message structure. The data exchange session may include a conversation with a user via the consumption layer, exchanging metadata or messages with another automated system or artificial intelligent cognition engine, or multiple machine cognition engines exchanging data. Information received and processed during the data exchange session may be stored in an interaction memory to provide continuity during the exchange and provide input for machine learning about the user, the message structure or the response. For example, when an initial post or query from a user is found to be fuzzy by a cognitive engine in the AI layer 512, depending on a nearest detectable intent, the conversation manager in the request orchestration layer 512 may communicate follow up questions formulated by the AI layer 516, via the consumption layer to the user, to detect the a more certain intent.

In some implementations, the system 500 may obtain characteristic information about an external entity that is linked to the captured message structure from any sources. An external entity may be linked to a message structure for many reasons. As examples, the link may arise because the external entity posted or sent the message, because the external entity was copied on or received a message, or because the external entity was named in the message content. In this regard, the characteristic information may be obtained from the captured message structure, the data exchange sessions with the external entity and/or data inputs received from the external entity during interaction with the exception handler. The machine cognition engines of the AI layer 516, for example, machine learning agents, may be trained to identify attributes of the external entity based on the characteristic information. The AI layer 516 may apply the learned attributes of the external entity to formulate the response to the captured message structure or to use in responding to future messages captured by the orchestration layer 512. Furthermore, a response to a detectable intent may be based on learning that is conducted by the machine cognition engines that may be trained on the replies that match various intents. The response entity may be trained with domain specific data In one embodiment, the VCA architecture 500 facilitates integration of artificial intelligence-powered virtual agents of the AI layer 516 with social media communication channels (for example, Facebook or Twitter or web or mobile portals) of the request orchestration layer 512 in order to respond to customer queries. This is achieved by developing the orchestration layer 512 around the AI layer 516 to manage sessions, conversations, messages and connectors for the social media as well as other communication channels to which the cognitive engines of the AI layer 516 are integrated. In some embodiments, when a consumer or customer accesses a social media channel or account, for example, FACEBOOK® or TWITTER®, of a company that has the integrated virtual cognitive agent as described with respect to FIGS. 1-6, and posts a query or comment regarding a brand or product of that company, the virtual cognitive agent as described with respect to FIGS. 1-6 understands and interprets the query. The VCA may post back an appropriate response to the customer or communicate via another channel. The integrated VCA may also automatically engage in having a meaningful conversation with the customer to improve or formulate the response.

In one example, when a customer posts a query for which the VCA system is not trained to answer, the request orchestration layer 512 may route the query to a human service agent. The human service agent may or may not be visible or detectable to the user. The human service agent may reply back to the VCA system, and the request orchestration layer 512 of the VCA system may channel the reply back to the user. Moreover, since both the question and the response are processed or channeled through the VCA system, the question and answer are invoked in a learning process and the result is stored in a database to support automatic reply to related questions going forward.

The methods, devices, processing, circuitry, VCAs, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and controlled, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible.

We claim:

1. A method comprising:
in a hardware processing system comprising processing circuitry, memory and a communication interface:
through the communication interface, connecting to a message communication platform external to the hardware processing system; and with the processing circuitry:
training machine cognition engines with domain specific data;
monitoring the message communication platform for a trigger;
responsive to the trigger, capturing a message structure hosted in the message communication platform;
determining an intent of a text element from the captured message structure;
determining whether the text element matches a sentiment indicator;
when the text element matches the sentiment indicator, categorizing the captured message structure into at least one category of a plurality of categories based on the matched sentiment indicator and transmitting the captured message structure to an exception handler of a plurality of exception handlers that corresponds to the at least one category; and
when the text element does not match the sentiment indicator:
executing the multiple machine cognition engines implemented in the hardware processing system to determine a query response characteristic of the text element;
identifying an external entity linked to the captured message structure;
automatically orchestrating a data exchange session with the external entity, the data exchange session including communicating with a user and exchanging data with external machine cognition engines;
identifying a private communication channel for the external entity;
communicating directly with the user by asking questions formulated by the multiple machine cognition engines via the private communication channel to determine the intent accurately;
formulating the response based on communication with the user;
connecting to a query response platform external to the hardware processing system and communicating the response to the query response platform; and
storing the communication with the user to provide a feedback regarding the response, the user, and the captured message structure to the multiple machine cognition engines.

2. The method of claim 1, wherein the query response platform comprises a social media platform, a web portal, a mobile device portal, or any combination thereof.

3. The method of claim 1 where:
transmitting the captured message structure to the exception handler comprises transmitting the captured message structure to a manual intervention system.

4. The method of claim 1, where the machine cognition engines comprises:
a natural language understanding processing agent;
a natural language question and answering agent; a dynamic logic agent;
a user behavior analysis agent; a machine learning agent;
a conversational agent that maintains context of a conversation with the user;
a natural language generation agent, or any combination thereof.

5. The method of claim 1 further comprising:
obtaining additional information for the machine cognition engines to formulate the response by accessing an electronically stored corpus of information comprising attributes and information associated with the external entity.

6. The method of claim 1 further comprising:
storing characteristic information about the external entity linked to the captured message structure that is obtained from the captured message structure, data exchange sessions with the external entity linked to the captured message structure, and prior data inputs received from the external entity linked to the captured message structure during interaction with the exception handler;
training the machine cognition engines to identify attributes of the external entity linked to the captured message structure responsive to the characteristic information; and
applying the external entity linked to the captured message structure attributes via the machine cognition engines in formulating the response.

7. The method of claim 1, where the message communication platform is the same as the query response platform.

8. A system comprising:
a memory;
a communication interface configured to connect to a message communication platform external to the system;
and processing circuitry configured to:
train multiple machine cognition engines with domain specific data;
monitor the message communication platform for a trigger;
responsive to the trigger, capture a message structure hosted in the message communication platform;
determine an intent of a text element from the captured message structure;
determine whether the text element matches a sentiment indicator;
when the text element matches the sentiment indicator, categorize the captured message structure into at least one category of a plurality of categories based on the matched sentiment indicator and transmit the captured message structure to an exception handler of a plurality of exception handlers that corresponds to the at least one category; and
when the text element does not match the sentiment indicator:

execute the multiple machine cognition engines implemented in the system to determine a query response characteristic of the text element;
identify an external entity linked to the captured message structure;
automatically orchestrate a data exchange session with the external entity, the data exchange session including communicating with a user and exchanging data with external machine cognition engines;
identify a private communication channel for the external entity;
communicate directly with the user by asking questions formulated by the multiple machine cognition engines via the private communication channel to determine the intent accurately;
formulate the response based on communication with the user;
connect to a query response platform external to the hardware processing system and communicate the response to the query response platform; and
store the communication with the user to provide a feedback regarding the response, the user, and the captured message structure to the multiple machine cognition engines.

9. The system of claim 8, wherein the query response platform comprises a social media platform, a web portal, a mobile device portal, or any combination thereof.

10. The system of claim 8 where:
the transmission of the captured message structure to the exception handler comprises transmission of the captured message structure to a manual intervention system.

11. The system of claim 8, where the machine cognition engines comprises:
a natural language understanding processing agent;
a natural language question and answering agent;
a dynamic logic agent;
a user behavior analysis agent;
a machine learning agent;
a conversational agent that maintains context of a conversation with the user;
a natural language generation agent, or any combination thereof.

12. The system of claim 8 where the processing circuitry is further configured to:
obtain additional information for the machine cognition engines to formulate the response by accessing an electronically stored corpus of information comprising attributes and information associated with the external entity linked to the captured message structure.

13. The system of claim 8 where the processing circuitry is further configured to:
store characteristic information about an external entity linked to the captured message structure that is obtained from:
the captured message structure;
data exchange sessions with the external entity linked to the captured message structure; and
prior data inputs received from the external entity linked to the captured message structure during interaction with the exception handler;
train the machine cognition engines to identify external entity linked to the captured message structure attributes responsive to the characteristic information;
and apply the external entity linked to the captured message structure attributes via the machine cognition engines in formulating the response.

14. The system of claim 8, where the message communication platform is the same as the query response platform.

15. A system comprising:
a memory;
a communication interface configured to connect to a message communication platform external to the system, where the external platform comprises a social media platform, a web portal, a mobile device portal, an email server, or any combination thereof; and
processing circuitry configured to:
train multiple machine cognition engines with domain specific data;
monitor the message communication platform for a trigger;
responsive to the trigger, capture a message structure hosted in the message communication platform;
determine an intent of a text element from the captured message structure;
determine whether the text element matches a sentiment indicator;
when the text element matches the sentiment indicator, categorize the captured message structure into at least one category of a plurality of categories based on the matched sentiment indicator and transmit the captured message structure to an exception handler of a plurality of exception handlers that corresponds to the at least one category;
when the text element does not match the sentiment indicator:
obtain and store characteristic information about an external entity linked to the captured message structure by:
accessing an electronically stored corpus of information comprising attributes and information associated with the external entity linked to the captured message structure;
accessing data inputs received from the external entity linked to the captured message structure during interaction with the manual intervention system;
train the multiple machine cognition engines implemented in the system responsive to the characteristic information to identify attributes of the external entity linked to the captured message structure;
execute the multiple machine cognition engines implemented in the system to determine a query response characteristic of the text element and apply the external entity attributes via the machine cognition engines;
automatically orchestrate a data exchange session with the external entity, the data exchange session including communicating with a user and exchanging data with external machine cognition engines;
identify a private communication channel for the external entity;
communicate directly with the user by asking questions formulated by the multiple machine cognition engines via the private communication channel to determine the intent accurately;
formulate the response based on communication with the user;
connect to a query response platform external to the hardware processing system and communicate the response to the query response platform, where the query response platform comprises a social media platform, a web portal, a mobile device portal, an email server, or any combination thereof; and store the communication with the user to provide a feedback regarding the response, the user, and the captured message structure to the multiple machine cognition engines.

16. The system of claim 15, where the machine cognition engines comprise:
- a natural language understanding processing agent;
- a natural language question and answering agent;
- a dynamic logic agent; a user behavior analysis agent;
- a machine learning agent;
- a conversational agent that maintains context of a conversation with the user;
- a natural language generation agent thereof.

* * * * *